United States Patent

Nair

(10) Patent No.: US 8,259,192 B2
(45) Date of Patent: Sep. 4, 2012

(54) DIGITAL IMAGE PROCESSING APPARATUS FOR PLAYING MOOD MUSIC WITH IMAGES, METHOD OF CONTROLLING THE APPARATUS, AND COMPUTER READABLE MEDIUM FOR EXECUTING THE METHOD

(75) Inventor: Prajit Nair, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 12/498,548

(22) Filed: Jul. 7, 2009

(65) Prior Publication Data

US 2010/0091138 A1 Apr. 15, 2010

(30) Foreign Application Priority Data

Oct. 10, 2008 (KR) .................. 10-2008-0099551

(51) Int. Cl.
*H04N 5/907* (2006.01)
(52) U.S. Cl. .................................................. 348/231.4
(58) Field of Classification Search ............. 348/231.99, 348/231.3, 231.4, 231.5, 231.6
See application file for complete search history.

(56) References Cited

U.S. PATENT DOCUMENTS

| | | | |
|---|---|---|---|
| 2002/0033889 A1 | 3/2002 | Miyazaki | |
| 2002/0134219 A1* | 9/2002 | Aoki | 84/609 |
| 2004/0052505 A1* | 3/2004 | Ahmad et al. | 386/69 |
| 2005/0158037 A1* | 7/2005 | Okabayashi et al. | 386/96 |
| 2007/0094686 A1* | 4/2007 | Kim et al. | 725/45 |
| 2007/0103565 A1* | 5/2007 | Xu et al. | 348/231.3 |
| 2010/0251164 A1* | 9/2010 | Karan et al. | 715/782 |

FOREIGN PATENT DOCUMENTS

JP 2004221666 A * 8/2004

* cited by examiner

*Primary Examiner* — Jason Whipkey
(74) *Attorney, Agent, or Firm* — Drinker Biddle & Reath LLP

(57) ABSTRACT

A digital image processing apparatus including an image storage medium arranged to store an image; a display unit arranged to display the image; a mood determination unit arranged to determine the mood of the image. The apparatus is arranged to select music that matches the determined mood of the image and arranged to play the selected music while displaying the image. A method of controlling a digital image processing apparatus, the method including (a) determining a mood of an image; and (b) playing music with a mood that matches the determined mood of the image while displaying the image on a display unit.

18 Claims, 5 Drawing Sheets

DIGITAL IMAGE PROCESSING APPARATUS FOR PLAYING MOOD MUSIC WITH IMAGES, METHOD OF CONTROLLING THE APPARATUS, AND COMPUTER READABLE MEDIUM FOR EXECUTING THE METHOD

CROSS-REFERENCE TO RELATED PATENT APPLICATION

This application claims the benefit of Korean Patent Application No. 10-2008-0099551, filed on Oct. 10, 2008 in the Korean Intellectual Property Office, the entire contents of which is incorporated herein by reference.

BACKGROUND OF THE INVENTION

1. Field of the Invention

The present invention relates to a digital image processing apparatus, a method of controlling the apparatus, and a computer readable medium for executing the method, and more particularly, to a digital image processing apparatus that may increase a user's appreciation when viewing a displayed image by playing mood music with the image.

2. Description of the Related Art

In general, a digital image processing apparatus displays on a display unit an image from an image file stored in an image storage medium. A digital photographing apparatus, which is a type of digital image processing apparatus, obtains data from incident light using an image capture device, and stores the data as an image file in the image storage medium. The digital photographing apparatus displays on the display unit an image of the image file stored in the storage medium in a playback mode, according to the user's manipulation.

When the image from the image file stored in the image storage medium is displayed on the display unit, a conventional image processing apparatus simply displays the image on the display unit. Of course, the user can appreciate the mood of the image to some extent while viewing the image displayed on the display unit. However, when using the conventional digital image processing apparatus, the user cannot perceive in depth the mood of the image being displayed on the display unit. In particular, when displaying on a display unit an image of an image file obtained by shooting using a digital photographing apparatus, which is a type of digital image processing apparatus, it is not easy for the user to recollect the memory, for example, a mood, at the moment of shooting only based on the image being displayed on the display unit.

SUMMARY OF THE INVENTION

The present invention provides a digital image processing apparatus that maximizes a user's appreciation when viewing a displayed image from an image file stored in an image storage medium on a display unit, a method of controlling the digital image processing apparatus, and a recording medium having recorded thereon a program for executing the method.

A digital image processing apparatus is disclosed including an image storage medium arranged to store an image; a display unit arranged to display the image; a mood determination unit arranged to determine the mood of the image. The digital image processing apparatus may be arranged to select music that matches the determined mood of the image and may be arranged to play the selected music while displaying the image. The digital image processing apparatus may include an image capture device arranged to generate an image from incident light. The image storage medium may be arranged to store the determined mood of the image associated with the image. The digital image processing apparatus may be arranged to have a plurality of shooting modes including a portrait shooting mode, a landscape shooting mode, and a sports shooting mode; and the mood determination unit may be arranged to determine the mood of the image based on the shooting mode used in capturing the image. The mood determination unit may be arranged to determine the mood of the image based on at least one of a shutter speed and an aperture value used by the digital image processing apparatus in capturing the image. The digital image processing apparatus may be arranged to determine the mood of the image based on the shutter speed and the aperture value used in capturing the image, the shutter speed and the aperture value being stored in the image storage medium. The digital image processing apparatus may include a music storage medium arranged to store music files with an associated mood; and the digital processing apparatus may be arranged to select one of the stored music files with an associated mood that matches the determined mood of an image being displayed on the display unit. The music storage medium may be arranged to store the music in a plurality of folders, each folder associated with a mood. The music storage medium and image storage medium may be integrated into a single storage medium. The associated mood may be selected by a user.

A method of controlling a digital image processing apparatus is disclosed that may include (a) determining a mood of an image; and (b) playing music with a mood that matches the determined mood of the image while displaying the image on a display unit. The method may include storing the determined mood with the image. Determining may further include determining the mood of the image based on a setting mode of the digital image processing apparatus used in capturing the image, the setting modes comprising a portrait shooting mode, a landscape shooting mode, and a sports shooting mode. Determining may further include determining the mood of the image of the image file based on a shooting mode of the digital image processing apparatus set in capturing the image. Determining may include determining the mood of the image based on at least one of a shutter speed and an aperture value used by the digital image processing apparatus in capturing the image file. The method may include storing music files in a plurality of folders each of the folders corresponding to a mood; and selecting a music file from a folder with a mood corresponding to the determined mood of the image. The method may include presetting the mood of each of the folders in response to receiving a mood selection from a user. The method may include storing music files and images on the same storage medium. The method may include storing music files with an associated mood in a music storage medium, the associated mood selected by a user.

A computer-readable medium is disclosed that is encoded with computer executable instructions that when executed by a digital image processing apparatus causes the computer to perform a method comprising: (a) determining a mood of an image; and (b) playing music with a mood that matches the determined mood of the image while simultaneously displaying the image on a display unit.

According to another aspect of the present invention, there is provided a computer readable medium having embodied thereon a program for executing any of the methods described above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Exemplary embodiments of the present invention will now be described in detail with reference to the attached drawings.

Figure 1:
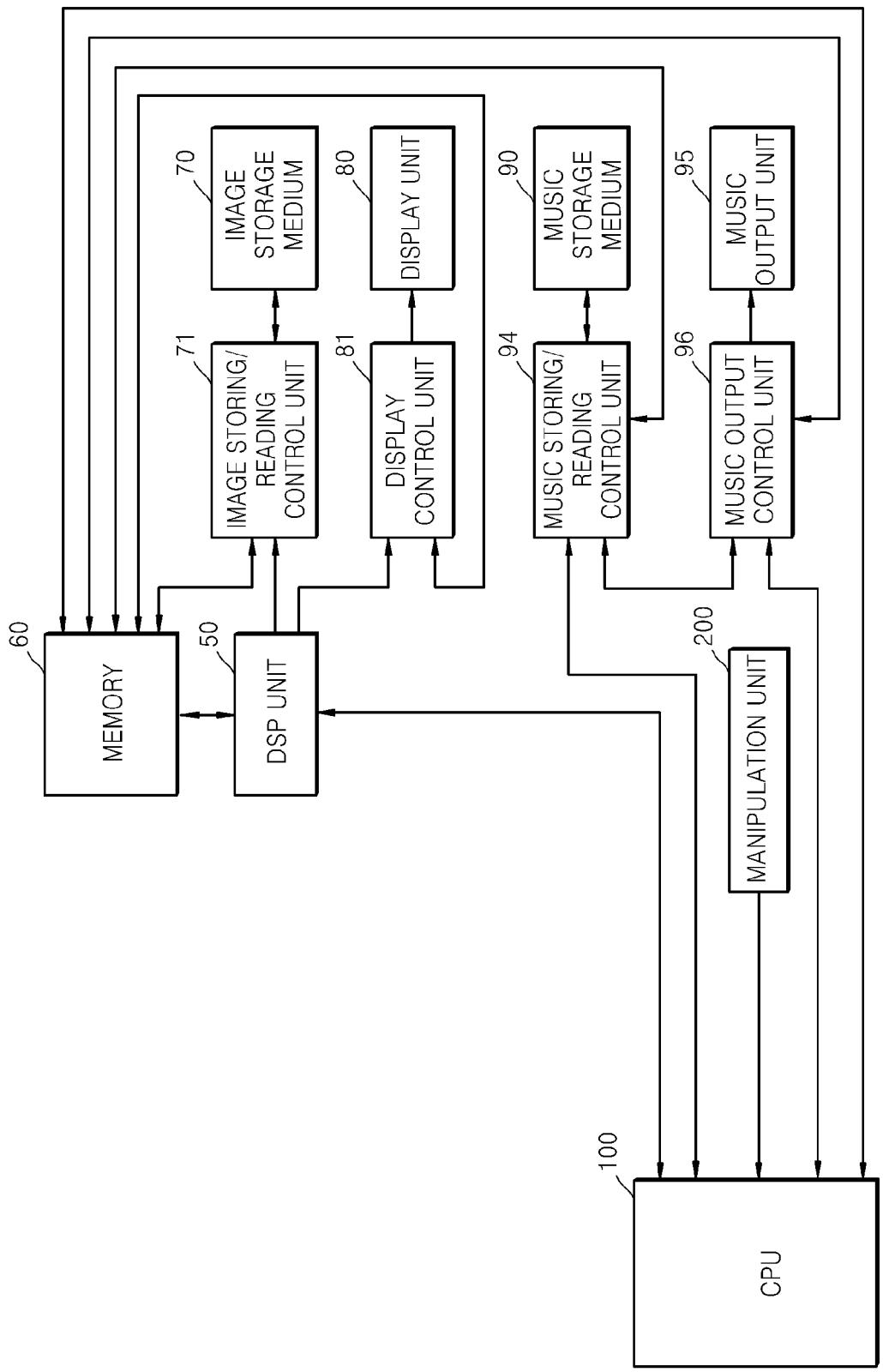
FIG. 1 is a schematic block diagram of an example of a digital image processing apparatus according to an embodiment of the present invention.

FIG. 1 is a schematic block diagram of an example of a digital image processing apparatus according to an embodiment of the present invention. The digital image processing apparatus in FIG. 1 may be, for example, a PDA (Personal Digital Assistant), a PMA (Portable Multimedia Player), or a mobile phone that can reproduce an image from an image file stored in an image storage medium. Referring to FIG. 1, the digital image processing apparatus according to the current embodiment of the present invention includes an image storage medium 70 storing an image file, a display unit 80 displaying an image from the image file stored in the image storage medium 70, and a mood determination unit (not shown) determining a mood of an image or of the image of the image file.

As shown in FIG. 1, the digital image processing apparatus may further include an image storing/reading control unit 71, a display control unit 81, a music storage medium 90, a music storing/reading control unit 94, a music output unit 95, a music output control unit 96, a memory 60, a digital signal processing (DSP) unit 50, a central processing unit (CPU) 100, and/or a manipulation unit 200. Hereinafter, for convenience's sake the digital image processing apparatus having the elements, as illustrated in FIG. 1, will be described in detail.

In an embodiment, the CPU 100 controls all operations of the digital image processing apparatus. The digital image processing apparatus includes the manipulation unit 200 having keys generating an electrical signal in response to a user's instruction. The electrical signal generated by the manipulation unit 200 is transmitted to the CPU 100 so that the CPU 100 can control the digital image processing apparatus in response to the electrical signal.

Alternatively, the image storing/reading control unit 71 may read data from the image file stored in the image storage medium 70 and provide the read data to the display control unit 81 via the memory 60 or via another path so that an image can be displayed on the display unit 80. The image storage medium 70 may be easily attached to and detached from the digital image processing apparatus or may be built in the digital image processing apparatus. Here, the memory 60 includes a read-only memory (ROM) or a random access memory (RAM). Of course, the data from the image file stored in the image storage medium 70 may be provided to the display control unit 81 in various manners, for example, via the DSP unit 50 described below.

The DSP unit 50 can perform digital signal processing, such as gamma correction or white balance correction, if needed. In addition, the DSP unit 50 may include the mood determination unit so that the user can effectively determine the mood of the image when the image from the image file is displayed on the display unit 80. The mood determination unit may be implemented as a separate element, rather than as part of the DSP unit 50. The mood determination unit may be implemented in various forms, for example, as part of other elements. In other words, the mood determination unit may be implemented in various forms as long as the mood determination unit is included in the digital image processing apparatus. Functions of the mood determination unit will be described below. Data output from the DSP unit 50 may be transmitted via the memory 60 or directly to the display control unit 81. The display control unit 81 controls the display unit 80 in order to display the image on the display unit 80.

The music output control unit 96 controls the music output unit 95 to output data on music of a music file stored in the music storage medium 90. The music output unit 95 may be a speaker, a terminal that can be connected with a jack, such as earphones, headphones, etc.

The digital image processing apparatus according to the current embodiment of the present invention plays music with a mood that matches the mood of the image from the image file that is determined by the mood determination unit, when the image from the image file stored in the image storage unit 70 is displayed on the display unit 80. That is, once the mood determination unit determines the mood of the image of the image file, music with a mood that matches the mood of the image as determined by the mood determination unit may be played back when the image from the image file is displayed on the display unit 80, so that the user can effectively appreciate the image. In particular, the mood determination unit automatically determines the mood of the image from the image file without requiring further user's manipulations, music with a mood that matches the mood of the image as determined by the mood determination unit is played back when the image of the image file is displayed on the display unit 80, so that the user can appreciate the image without requiring further user manipulations while listening to the music with the mood that matches the mood of the image being displayed. In another embodiment, the mood of the image may be selected by the user.

Figure 2:
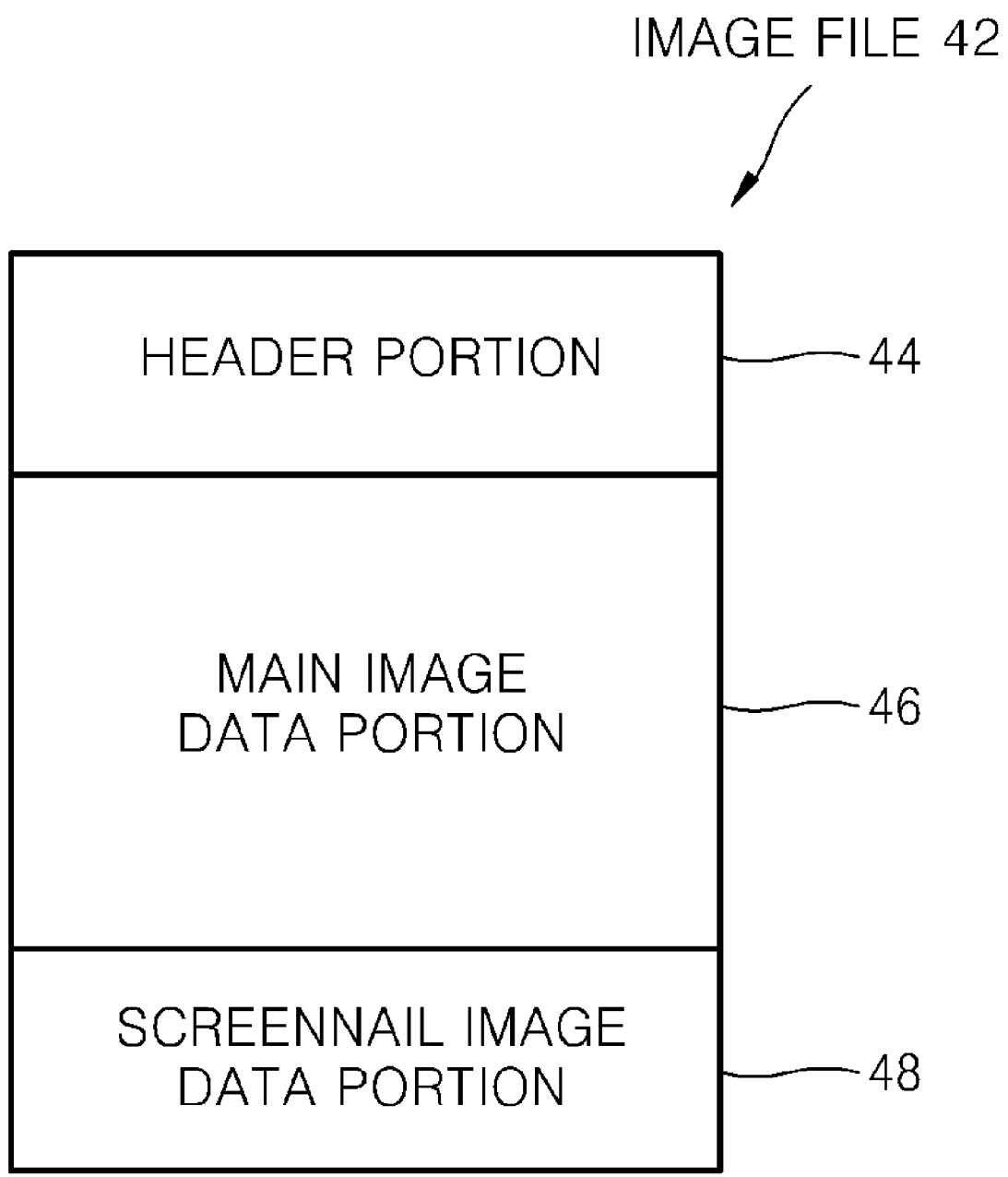
FIG. 2 is a conceptual diagram illustrating an example of a structure of an image file.

FIG. 2 is a conceptual diagram of an example of a structure of an image file 42 stored in the image storage medium 70, which may be built in the digital image processing apparatus of FIG. 1 or may be attachable to and detachable from the digital image processing apparatus of FIG. 1. Referring to FIG. 2, the image file 42 includes a header portion 44, a main image data portion 46, and a screen nail image data portion 48. Of course, the image file that is stored in and reproduced by the digital image processing apparatus according to the current embodiment of the present invention is not limited to the structure as illustrated in FIG. 2 and may have various other structures.

The main image data portion 46 includes data of the image. The header portion includes data 44, such as a manufacturer of the digital image processing apparatus used to obtain the image file, shooting date and time, a shutter speed, an aperture (iris) value, a zoom ratio, a thumbnail image, and the like. A thumbnail image is an image reduced from a main image stored in the main image data portion. The screen nail image data portion 48 includes data of a smaller image than the main image that can be used to be displayed, instead of the main image, on the display unit 80. A screen nail image means an image displayed on the display unit 80 in a playback mode of, for example, a digital photographing apparatus.

In the structure of the image file 42 described above, the header portion 44 includes Exif information, so that the mood determination unit can determine a mood of an image from an image file, based on the Exif information of the image file. In other words, the mood determination unit may determine the mood of the image of the image file based on a shutter speed or an aperture value that were set to obtain the image file and stored in the header portion 44 of the image file 42. For example, if the aperture value is large and the shutter speed is fast, the image file may be presumed to have been obtained in circumstances with a sufficient amount of ambient light. Thus, the image from the image file may be determined to have a bright mood. Thus, in this case, the mood determination unit may determine the mood of the image from the image file to be bright and light. Meanwhile, if the aperture value is small and the shutter speed is slow, the image file 42 may be presumed to have been obtained in circumstances with an insufficient amount of ambient light. Thus, the image from the image file 42 may have a dark or calm mood. Thus, in this case, the mood determination unit may determine the mood of the image from the image file to be dark or calm.

Figure 3:
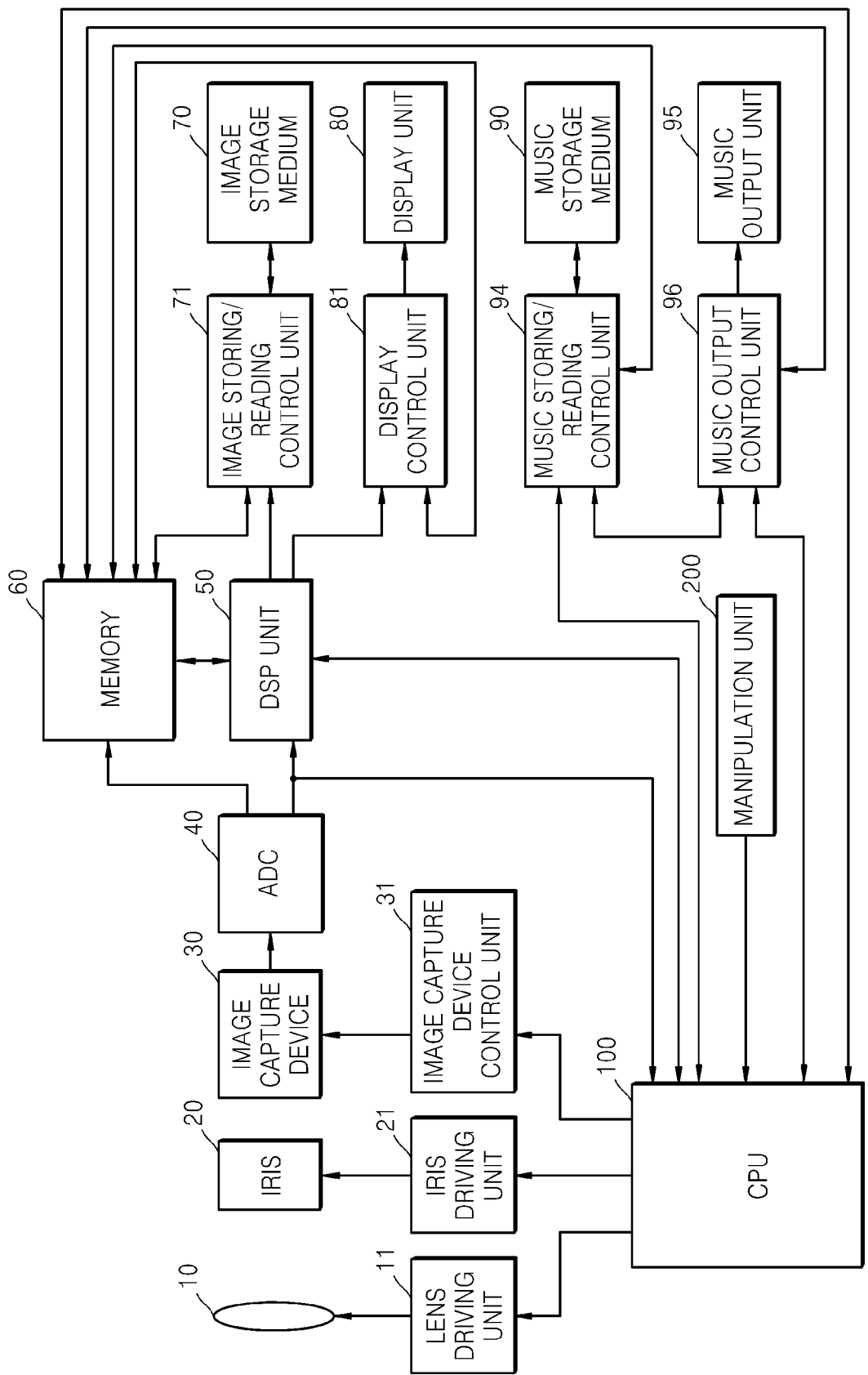
FIG. 3 is a schematic block diagram an example of a digital image processing apparatus according to another embodiment of the present invention.
Figure 4:
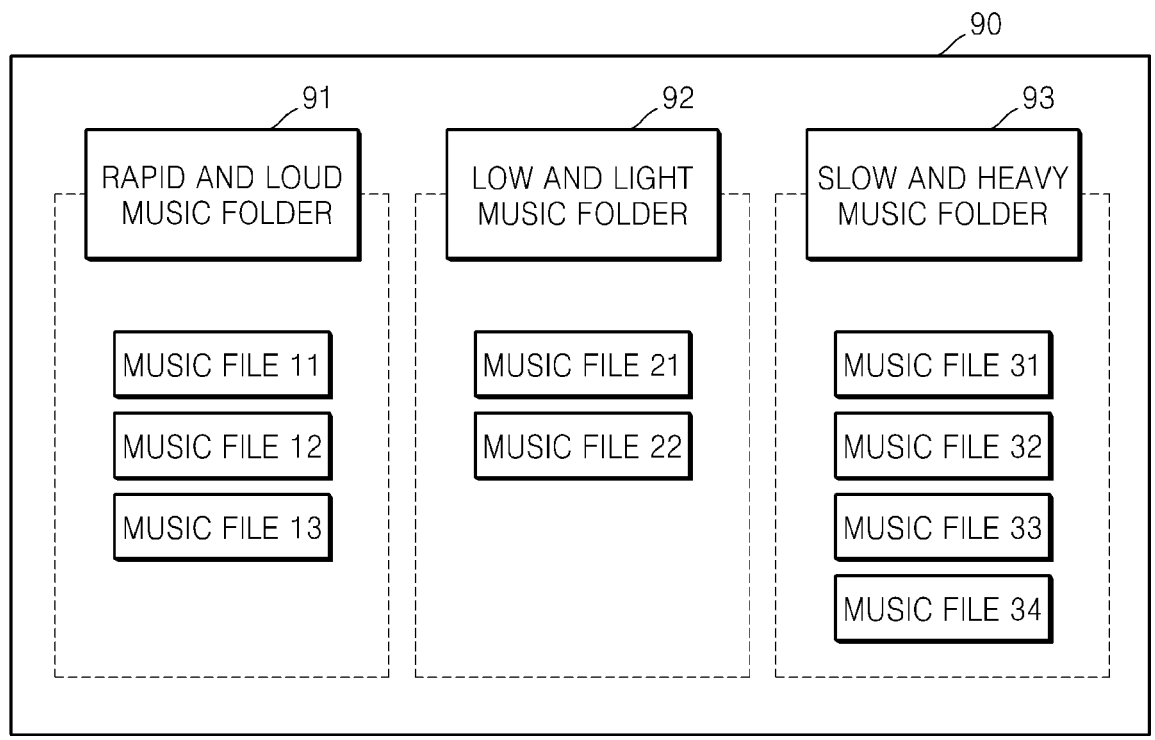
FIG. 4 is a conceptual diagram illustrating music files stored under a plurality of folders in an example of a music storage medium of the digital image processing apparatuses of FIGS. 1 and 3.

FIG. 3 is a schematic block diagram of a digital image processing apparatus according to another embodiment of the present invention. The digital image processing apparatus according to the current embodiment of the present invention, which is a digital photographing apparatus, further includes an image capture device 30, as illustrated in FIG. 4, in addition to the elements of the digital image processing apparatus described with reference to FIG. 1. The digital image processing apparatus of FIG. 3 may also further include a lens 10, an iris 20, an image capture device 30, an analog-to-digital converter (ADC) 40, a lens driving unit 11, an iris driving unit 21, and an image capture device controller 31. The image capture device 30 generates data from incident light.

In a shooting mode of the digital image processing apparatus according to the current embodiment of the present invention, if an electrical signal generated in response to a user's instruction through the manipulation unit 200 is applied to the CPU 100, the CPU 100 analyzes the electrical signal and controls a lens driving unit 11, an iris driving unit 21, and an image capture device controller 31, thus controlling the location of a lens 10, the degree of openness of an iris 20, and the sensitivity of an image capture device 30, respectively. If a data signal of the image is output from the image capture device 30, the data signal is converted into digital image data by an analog-to-digital converter (ADC) 40 and then input to the CPU 100 and the DSP unit 50. The DSP unit 50 may perform digital signal processing, such as gamma correction, white balance correction, and the like, if needed.

Image data output from the DSP unit 50 is transmitted to the display control unit 81 via the memory 60. Here, the memory 60 includes a ROM or a RAM. The display control unit 81 controls the display unit 80 to display an image on the display unit 80. Image data output from the DSP unit 50 is input to the image storing/reading control unit 71 via the memory 60. The image storing/reading control unit 71 stores the image data in the image storage medium 70 automatically or in response to a signal received from the user. Alternatively, in the digital image processing apparatus according to the current embodiment of the present invention, the image storing/reading control unit 71 may read image data from the image file stored in the image storage medium 70 and provide the read image data via the memory 60 to the display control unit 81 so that the image can be displayed on the display unit 80.

In the digital image processing apparatus according to the current embodiment of the present invention, when an image file from the image data generated by the image capture device 30 is stored in the image storage medium 70, the mood determination unit determines the mood of the image based on the image data generated by the image capture device 30 and records mood data regarding the mood of the image from the image file in the header portion of the image file. When the image from the image file stored in the image storage medium 70 is displayed on the display unit 80, the mood data stored in the header portion of the image file is read, and music with a mood that matches the mood of the image of the image file displayed on the display unit 80 is played back.

When storing the image file in the image storage medium 70, mood data regarding the mood of the image from the image file is recorded in the header portion of the image file. In this case, the mood data may define a concrete mood of the image. Examples of concrete moods that may be recorded include a bright mood, a light mood, a dark mood, a calm mood, and the like.

When the mood data is recorded in the header portion of the image file, the mood of the image of the image file displayed on the display unit 80 may be determined based on the shutter speed or the aperture value of the digital image processing apparatus that was set to obtain the image file and then recorded as the mood data. For example, in an embodiment, if the aperture value is large and the shutter speed is fast, the image file may be presumed to have been obtained in circumstances with a sufficient amount of ambient light. Thus, the image from the image file may have a bright mood. Thus, in this case, the mood determination unit may determine the mood of the image to be bright and light. Meanwhile, if the aperture value is small and the shutter speed is slow, the image file may be presumed to have been obtained in circumstances with an insufficient amount of ambient light. Thus, the image from the image file may have a dark or calm mood. Thus, in this case, the mood determination unit may determine the mood of the image to be dark or calm. The present invention is not limited to determining the mood of an image based on the shutter speed or the aperture value and may be implemented in various forms. For example, the mood of the image from the image file may be determined by analyzing colors that are mainly included in the image from the image file. For example, if primary colors are mainly included in the image, the mood of the image from the image file may be determined to be bright and light. If achromatic colors are mainly included in the image, the mood of the image from the image file may be determined to be dark or heavy.

In addition, the digital image processing apparatus according to the current embodiment of the present invention, which may be a digital photographing apparatus, may have a function of selecting one of a plurality of shooting modes, including a portrait shooting mode, a landscape shooting mode, and a sports shooting mode. When the mood data is recorded in the header portion of an image file after the image file is obtained, the mood of an image of the image file displayed on the display unit 80 may be determined based on the shooting mode of the digital image processing apparatus that was set to obtain the image file and is recorded as the mood data of the image. For example, an image from an image file obtained in a sports shooting mode may be presumed normally to be full of excitement, and the mood of the image may be recorded to be exciting in the header portion of the image file. In addition, an image from an image file obtained in a landscape shooting mode may be presumed normally to be contemplative, and the mood of the image may be recorded to be calm in the header portion of the image file. The present invention may be not limited to determining the mood of an image of an image file, which will be recorded as mood data, based on the shooting mode of the digital image processing apparatus that was set to obtain the image file, and may be implemented in various forms. For example, the mood of the image of the image file displayed on the display unit 80 may be determined further in consideration of the shutter speed or the aperture value that was set to obtain the image file, in addition to the shooting mode.

FIG. 4 is a conceptual diagram of music files stored under a plurality of folders in the music storage medium 90 of the digital image processing apparatuses according to the embodiments of the present invention described above. When the digital image processing apparatus includes the music storage medium 90, the music storage medium 90 may have a plurality of folders, each of which corresponds to a specific mood. FIG. 4 illustrates a case where the music storage medium 90 has three folders, i.e., a rapid and loud music folder 91, a low and light music folder 92, and a slow and heavy music folder 93. A plurality of music files are stored under each folder.

In this case, when an image from an image file stored in the image storage medium 80 is displayed on the display unit 80, music of a music file under one of the folders that is present to correspond to the mood of the image being displayed is played back. The user may store his/her favorite music files under each of the folders that is preset to correspond to the mood of each music file. In the case of displaying an image from an image file stored in the image storage medium 80 while playing back music of a music file under the folder preset to correspond to the mood that matches the mood of the image being displayed, if the corresponding folder includes a plurality of music files that may be sequentially or randomly played back. Each folder of the music storage medium 90 may be preset by the user to correspond to a specific mood.

Unlike the structure of the music storage medium 90 illustrated in FIG. 4, the music storage medium 90 that may be included in the digital image processing apparatus may store a plurality of music files without folders. In this case, music of each music file may be preset by the user as one having a specific mood.

In addition, although the music storage medium 90 and the image storage medium 70 are illustrated as being separate in the digital image processing apparatuses in FIGS. 1 and 3, this is only for the convenience of illustration. Thus, the music storage medium 90 and the image storage medium 70 may be implemented in various forms, for example, may be integrated into a single element.

Figure 5:
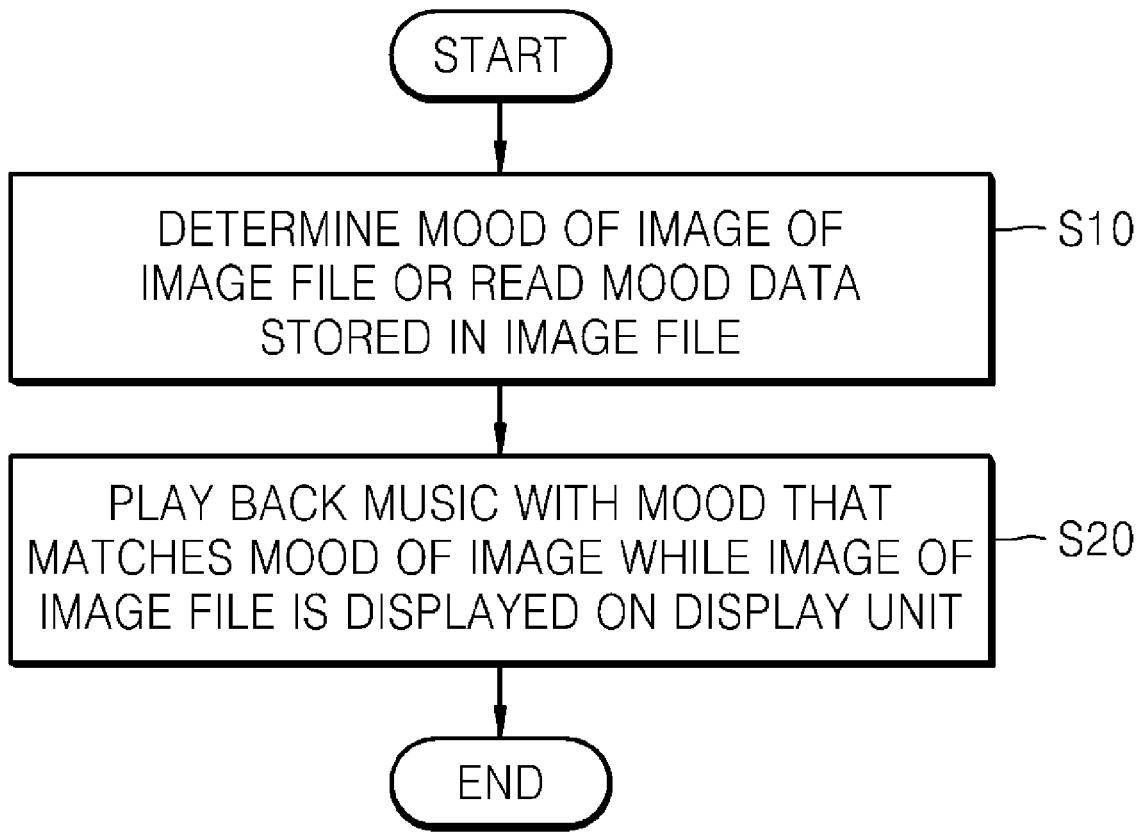
FIG. 5 is a schematic flowchart of an example of a method of controlling a digital image processing apparatus, according to an embodiment of the present invention.

FIG. 5 is a schematic flowchart of an example of a method of controlling a digital image processing apparatus, according to an embodiment of the present invention. Referring to FIG. 5, the method of controlling a digital image processing apparatus according to the current embodiment of the present invention may include determining the mood of an image of an image file based on the image file stored in a image storage medium or reading mood data of the image from the image file, the mood data being stored with the image file (operation S10), and playing back music with a mood that matches the mood determined in operation S10 when the image of the image file is displayed on a display unit (operation S20). As a result, the user can effectively appreciate the image being displayed on the display unit while listening to music with a mood that matches the mood of the image. In particular, it is possible to automatically determine the mood of an image from an image file or to automatically read mood data of the image, without requiring further additional user's manipulations, and music with a mood that matches the mood of the image is played back while the image from the image file is displayed on the display unit. As a result, the user can appreciate the image while listening to the music with the mood that matches the mood of the image.

When storing an image file in an image storage medium, the digital image processing apparatus may record mood data of the image from the image file in the header portion of the image file. In this case, operation S10 may be the operation of reading the mood data stored in the header portion of the image file.

In particular, when the digital image processing apparatus has a function of selecting one of a plurality of shooting modes, including a portrait shooting mode, a landscape shooting mode, and a sports shooting mode, the mood of the image from the image file displayed on the display unit may be determined based on the shooting mode of the digital image processing apparatus set to obtain the image file, and then recorded as the mood data of the image in the header portion of the image file. When the mood data is recorded in the header portion of the image file, the mood of the image in the image file may be determined based on the shutter speed or the aperture value of the digital image processing apparatus that was set to obtain the image file, and then recorded as the mood data in the header portion of the image file.

If no mood data has been recorded in the header portion of the image file, operation S10 may be the operation of determining the mood of the image in the image file based on the shutter speed or the aperture value set to obtain the image file and stored in the header portion of the image file.

In addition, the digital image processing apparatus may store music files under a plurality of folders in a music storage medium. In this case, as illustrated in FIG. 4, each folder may be preset to correspond to a specific mood. In this case, operation S20 may be the operation of playing back music of a music file in the folder with a mood that matches the mood of the image determined in operation S10. In this case, each folder of the music storage medium may be preset by the user to correspond to a specific mood. The music storage medium may be integrated into a single element together with an image storage medium of the digital image processing apparatus. Alternatively, the music storage medium may include only a plurality of music files, not folders. In this case, music of each music file may be preset as one having a specific mood by the user.

A computer executable instructions that execute in an image processing apparatus the image processing method according to the above embodiment of the present invention and/or modified examples thereof may be stored in a computer recording medium. For example, the recording medium may be embodied as the storage medium 70 or the memory 60 of FIG. 1, or an additional type of recording medium. Examples of the recording medium include a magnetic recording medium, e.g., a read-only memory (ROM), a floppy disc, or a hard disc, and an optical recording medium, e.g., a compact disc (CD)-ROM or a digital versatile disc (DVD).

For convenience, in the description above, the functionality described has been divided into a number of units; however, the number of units may vary and the functionality described above may be differently divided among the units, or the functionality described above may be implemented without units. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

As described above, according to the present invention, a digital image processing apparatus that may increase a user's appreciation when viewing a displayed image from an image file stored in an image storage medium on a display unit, a method of controlling the apparatus, and a recording medium having recorded thereon a program for executing the method can be implemented.

While this invention has been particularly shown and described with reference to exemplary embodiments thereof, it will be understood by one of ordinary skill in the art that various changes in form and details may be made therein without departing from the spirit and scope of the invention as defined by the appended claims.

What is claimed is:

1. A digital image processing apparatus comprising:
an image storage medium to store an image;
a display unit to display the image;
a music output unit to play music having a mood corresponding to a mood of the image while the image is being displayed; and
a processor to select the music based on a photographing setting used to capture the image;
wherein the photographing setting comprises at least one of a shutter speed, or an aperture value.

2. The digital image processing apparatus of claim 1, further comprising an image capture device to generate the image from incident light.

3. The digital image processing apparatus of claim 1, wherein the image storage medium is to store the mood of the image together with the image.

4. The digital image processing apparatus of claim 1, wherein the photographing setting comprises at least one of a portrait shooting mode, a landscape shooting mode, or a sports shooting mode.

5. The digital image processing apparatus of claim 1, wherein the photographing setting is stored in the image storage medium.

6. The digital image processing apparatus of claim 1, further comprising:
a music storage medium to store music files having associated moods, wherein the music is selected from ones of the stored music files having an associated mood corresponding to the mood of the image being displayed.

7. The digital image processing apparatus of claim 6, wherein the music storage medium is to store the music files in a plurality of folders according to their associated moods.

8. The digital image processing apparatus of claim 6, wherein the image storage medium comprises the music storage medium.

9. The digital image processing apparatus of claim 6, wherein the associated moods are selected by a user.

10. A method of controlling a digital image processing apparatus, the method comprising:
(a) determining a mood of an image; and
displaying an image; and
(b) playing music with having a mood that matches the determined corresponding to a mood of the image while displaying the image, on a display unit the music selected by the digital image processing apparatus based on a photographing setting used to capture the image;
wherein the photographing setting comprises at least one of a shutter speed, or an aperture value.

11. The method of claim 10, further comprising:
storing the mood of the image together with the image.

12. The method of claim 11, wherein the photographing setting comprises at least one of a portrait shooting mode, a landscape shooting mode, or a sports shooting mode.

13. The method of claim 10, further comprising:
storing music files in a plurality of folders based on moods associated with the music files; and
selecting the music from a folder associated with a mood corresponding to the mood of the image.

14. The method of claim 13, further comprising setting the mood of each of the folders in response to user inputs.

15. The method of claim 13, further comprising:
storing the music files and the image on a same storage medium.

16. The method of claim 10, further comprising:
storing music files having associated moods in a music storage medium, the associated moods selected by a user.

17. A non-transitory computer-readable medium storing computer executable instructions that, when executed, cause a machine to at least carry out the method of claim 10.

18. A digital image processing apparatus comprising:
an image sensor to capture an image;
a display unit to display the image;
a music output unit to play music while the image is being displayed; and
a processor to select the music based on a photographing setting used to capture the image;
wherein the photographing setting comprises at least one of a shutter speed, or an aperture value.

* * * * *